(12) United States Patent
Momiyama et al.

(10) Patent No.: US 10,215,561 B2
(45) Date of Patent: Feb. 26, 2019

(54) METHOD OF DESIGNING CONTAINER OF LIQUID REFLECTION INCLINATION SENSOR, INCLINATION SENSOR INCLUDING THE CONTAINER, AND METHOD OF PRODUCING INCLINATION SENSOR INCLUDING THE CONTAINER

(71) Applicant: TOPCON CORPORATION, Tokyo (JP)

(72) Inventors: Homare Momiyama, Tokyo (JP); Akinobu Sugiura, Tokyo (JP); Hideyuki Matsumoto, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 235 days.

(21) Appl. No.: 15/407,804

(22) Filed: Jan. 17, 2017

(65) Prior Publication Data

US 2017/0205233 A1 Jul. 20, 2017

(30) Foreign Application Priority Data

Jan. 18, 2016 (JP) ................................. 2016-007021

(51) Int. Cl.
*G01C 9/20* (2006.01)
*G01C 9/06* (2006.01)
*G01F 23/14* (2006.01)

(52) U.S. Cl.
CPC ................. *G01C 9/20* (2013.01); *G01C 9/06* (2013.01); *G01F 23/14* (2013.01); *G01C 2009/066* (2013.01)

(58) Field of Classification Search
CPC ... G01C 9/20; G01C 9/06; G01C 9/18; G01C 9/00; G01C 2009/062; G01C 2009/064; G01C 2009/066; G01C 2009/068
(Continued)

(56) References Cited

U.S. PATENT DOCUMENTS 4,993,262 A * 2/1991 Storrar ...................... G01F 3/18
73/242
5,227,862 A * 7/1993 Oshida ............... G01B 11/0608
356/490

(Continued)

FOREIGN PATENT DOCUMENTS

JP 11-118482 4/1999
JP 2007-127628 5/2007

*Primary Examiner* — Christopher W Fulton
(74) *Attorney, Agent, or Firm* — Roberts Mlotkowski Safran Cole & Calderon, P.C.

(57) ABSTRACT

A method of designing a container of a liquid reflection inclination sensor includes a liquid surface calculating step (S1) that calculates a shape of a liquid surface of a liquid in a horizontal direction "x" and a vertical direction "y" by utilizing the Young-Laplace formula and the hydrostatic pressure formula, the liquid surface formed on a plate extending vertically and infinitely with respect to a horizontal part of the liquid surface, an optical simulation step (S2) that obtains a light receiving pattern by reflecting a dark field pattern (4') irradiated from an imaginary light source (2') on an imaginary mirror plane (9a') having the shape of the liquid surface, and a container adjusting step (S3-S4) that adjusts a shape of a cylindrical container (10) for enclosing the liquid by judging whether image accuracy of the light receiving pattern satisfies demanded sensor accuracy.

9 Claims, 10 Drawing Sheets

(58) Field of Classification Search
USPC ....... 33/290, 300, 301, 365, 366.15, 366.16, 33/366.23, 377; 702/154
See application file for complete search history.

(56) References Cited

U.S. PATENT DOCUMENTS

| | | | | |
|---|---|---|---|---|
| 6,094,268 | A * | 7/2000 | Oshida | G03F 9/7049 250/548 |
| 7,793,424 | B2 * | 9/2010 | Laabs | G01C 15/002 33/290 |
| 2002/0139940 | A1 * | 10/2002 | Ohtomo | G01C 9/06 250/559.3 |
| 2005/0225748 | A1 * | 10/2005 | Erne | G01C 9/06 356/139.1 |
| 2007/0018662 | A1 * | 1/2007 | Pfaff | G01R 15/241 356/496 |
| 2015/0212308 | A1 * | 7/2015 | Sirat | G02B 21/0072 250/459.1 |
| 2016/0104505 | A1 * | 4/2016 | Yamasaki | G11B 7/1353 369/110.03 |
| 2017/0108333 | A1 * | 4/2017 | Kamiki | G01C 9/06 |
| 2018/0003728 | A1 * | 1/2018 | Satou | G01N 21/84 |

* cited by examiner

METHOD OF DESIGNING CONTAINER OF LIQUID REFLECTION INCLINATION SENSOR, INCLINATION SENSOR INCLUDING THE CONTAINER, AND METHOD OF PRODUCING INCLINATION SENSOR INCLUDING THE CONTAINER

TECHNICAL FIELD

The present invention relates to a liquid reflection inclination sensor, and specifically, to a method of designing a container to form a free liquid surface of the sensor, an inclination sensor including the container, and a method of producing an inclination sensor including the container.

BACKGROUND ART

Generally, a surveying instrument incorporates an inclination sensor, and is leveled up based on results of detection by the inclination sensor and adjusted so as to take a horizontal posture. As this inclination sensor, a liquid reflection type is commonly used. The liquid reflection type reflects a predetermined dark field pattern irradiated from a light source on a surface of a liquid (free liquid surface), receives this reflected light by a light receiving sensor, and detects a displacement amount of the light receiving pattern (light receiving image). For example, according to Patent Literature 1, a dark field pattern formed through one-dimensional slits is reflected on a free liquid surface, and a displacement amount thereof is detected. In Patent Literature 2, a dark field pattern formed through reticular two-dimensional slits is reflected on a free liquid surface, and the position of the pattern is calculated from a pattern array obtained by summing results of detection by a light receiving sensor in the X direction and the Y direction.

CITATION LIST

Patent Literatures

[Patent Literature 1] Japanese Published Unexamined Patent Application No. H11-118482
[Patent Literature 2] Japanese Published Unexamined Patent Application No. 2007-127628

SUMMARY OF THE INVENTION

Problem to be Solved by the Invention

The free liquid surface described above is formed by enclosing a liquid with appropriate viscosity within a cylindrical container with a lid. A size of this container is required to allow a change in liquid surface shape (meniscus) neighboring a wall surface of the container. On the other hand, to meet recent demands for downsizing of sensors, it has been required to make the size of the container smaller. However, as a method of designing a container shape, a method was conventionally conducted in which a container was actually prepared, a liquid was enclosed within the container, and the liquid was irradiated with light from a light source to obtain an actual light receiving pattern, and the results were fed back again to the design. In addition, a liquid surface shape changes depending also on the properties of the liquid to be enclosed and/or temperature conditions, and therefore, the above-described method needed to be repeated in various conditions according to specifications (a temperature range which the sensor is used) demanded for the sensor. Therefore, there have been problems that optimization of the container shape takes time and involves high cost.

The present invention was made to solve the above-described problems, and an object thereof is to swiftly obtain a container shape suitable for sensor specifications at low cost in a liquid reflection inclination sensor.

Means for Solving the Problem(s)

In order to solve the above-described problems, a method of designing a container of a liquid reflection inclination sensor according to an aspect of the present invention includes a liquid surface calculating step that calculates a shape of a liquid surface of a liquid in a horizontal direction "x" and a vertical direction "y" by utilizing the Young-Laplace formula and the hydrostatic pressure formula, the liquid surface formed on a plate extending vertically and infinitely with respect to a horizontal part of the liquid surface; an optical simulation step that obtains a light receiving pattern by reflecting a dark field pattern irradiated from an imaginary light source on an imaginary mirror plane having the shape of the liquid surface; and a container adjusting step that adjusts a shape of a cylindrical container for enclosing the liquid by judging whether image accuracy of the light receiving pattern satisfies demanded sensor accuracy.

In the aspect described above, it is also preferable that the liquid surface calculating step includes a second step that obtains an actual contact angle "θ1" of the liquid with the container, and offsets a y-axis of a first curve "f1" representing the shape of the liquid surface in an x-axis direction until an angle between the first curve "f1" and the y-axis corresponds to the actual contact angle "θ1."

In the aspect described above, it is also preferable that the liquid surface calculating step includes a third step that obtains the first curve "f1" from each of two directions, one is from one side wall of the container and the other is from an opposite side wall, and obtains a second curve "f2" representing a shape of the liquid surface in the container when "X" is a horizontal distance from a center of the container and "Y" is a height of the liquid surface.

In the aspect described above, it is also preferable that the liquid surface calculating step includes a fourth step that complements the shape of the second curve "f2" neighboring X=0 by utilizing a polynomial expression.

In the aspect described above, it is also preferable that the container adjusting step conducts the optical simulation step while fixing a light flux diameter of the light from a light source which enters the container and assuming a length of the container in the "X" direction, and then, reduces the length of the container in the "X" direction when the image accuracy of the light receiving pattern satisfies the demanded sensor accuracy, and increases the length of the container in the "X" direction when the image accuracy of the light receiving pattern does not satisfy the demanded sensor accuracy.

In the aspect described above, it is also preferable that the container adjusting step conducts the optical simulation step while fixing a length of the container in the "X" direction and assuming a light flux diameter of the light from the light source which enters the container, and then, reduces the light flux diameter when the image accuracy of the light receiving pattern satisfies the demanded sensor accuracy, and increases the light flux diameter when the image accuracy of the light receiving pattern does not satisfy the demanded sensor accuracy.

In the aspect described above, it is also preferable that the method further includes a container height designing step that obtains a highest value "Ymax" of the Y-value of the second curve "f2," and then, designs a height "h" of the container so as to be equal to or higher than a value resulting from adding the highest value "Ymax" to a height "h'" of a horizontal part of the liquid surface of the liquid.

A liquid reflection inclination sensor according to an aspect of the present invention includes: a light source; a collimate lens that collimates a light flux from the light source; a dark field pattern where light from the collimate lens enters, and having contrast recognizable through image analysis; a beam splitter that sets the light which has passed through the dark field pattern toward a free liquid surface; a focus lens that concentrates the light from the beam splitter; a liquid that forms the free liquid surface; a container that encloses the liquid, formed in a cylindrical shape with a minimum horizontal length designed so that image accuracy of a light receiving pattern satisfies demanded sensor accuracy, the light receiving pattern obtained by utilizing the Young-Laplace formula and the hydrostatic pressure formula and by reflecting the dark field pattern on an imaginary mirror plane having a shape of a liquid surface of the liquid formed on a plate extending vertically and infinitely with respect to a horizontal part of the surface; a light receiving element that receives a reflected light from the free liquid surface; and a processing unit that analyzes a light receiving image of the light receiving element.

A method of producing a liquid reflection inclination sensor according to an aspect of the present invention includes: a liquid surface calculating step that calculates a shape of a liquid surface of a liquid in a horizontal direction "x" and a vertical direction "y" by utilizing the Young-Laplace formula and the hydrostatic pressure formula, the liquid surface formed on a plate extending vertically and infinitely with respect to a horizontal part of the liquid surface; an optical simulation step that obtains a light receiving pattern by reflecting a dark field pattern irradiated from an imaginary light source on an imaginary mirror plane having the shape of the liquid surface; a container adjusting step that adjusts a shape of a cylindrical container for enclosing the liquid by judging whether image accuracy of the light receiving pattern satisfies demanded sensor accuracy; and a step of forming a cylindrical container with a set minimum horizontal length.

EFFECT OF THE INVENTION

According to the present invention, a container shape suitable for sensor specifications can be swiftly obtained at low cost in a liquid reflection inclination sensor.

BRIEF DESCRIPTION OF THE DRAWINGS

FIG. 14(a) is a view showing a form example 1, and FIG. 14(b) is a view showing a form example 2.

DETAILED DESCRIPTION OF INVENTION

A preferred embodiment of the present invention is described with reference to the drawings.

Figure 1:
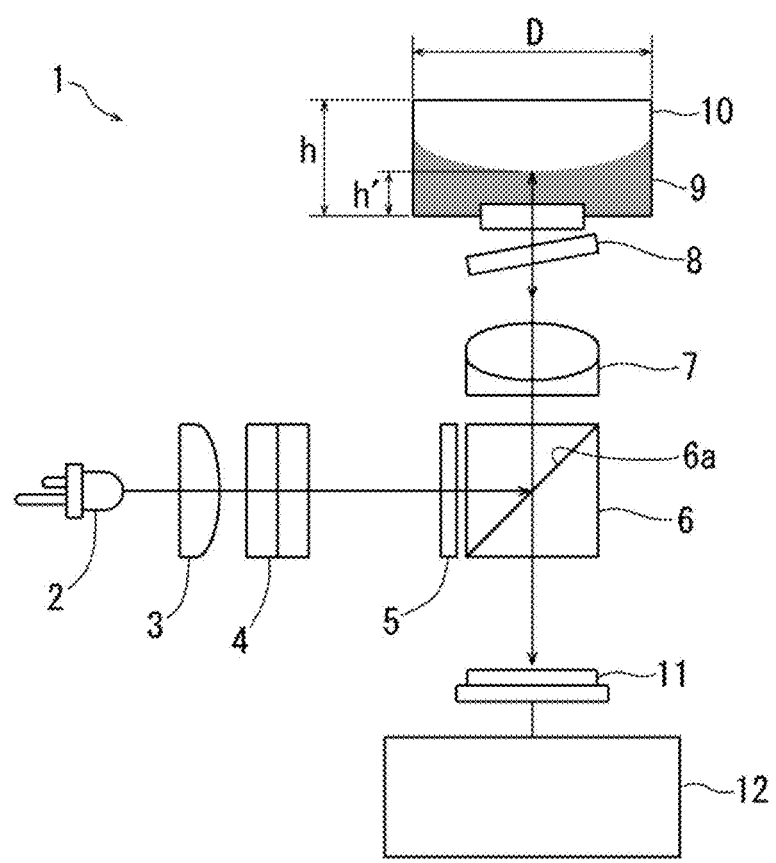
FIG. 1 is a configuration diagram of an optical system of a liquid reflection inclination sensor according to an embodiment.

FIG. 1 is a configuration diagram of an optical system of a liquid reflection inclination sensor (hereinafter, simply referred to as an inclination sensor) 1 according to an embodiment. The inclination sensor 1 includes a light source 2, a collimate lens 3, a dark field pattern 4, a polarization plate 5, a beam splitter 6, a focus lens 7, a λ/4 plate 8, a liquid 9, a container 10, a light receiving element 11, and a processing unit 12.

Figure 2:
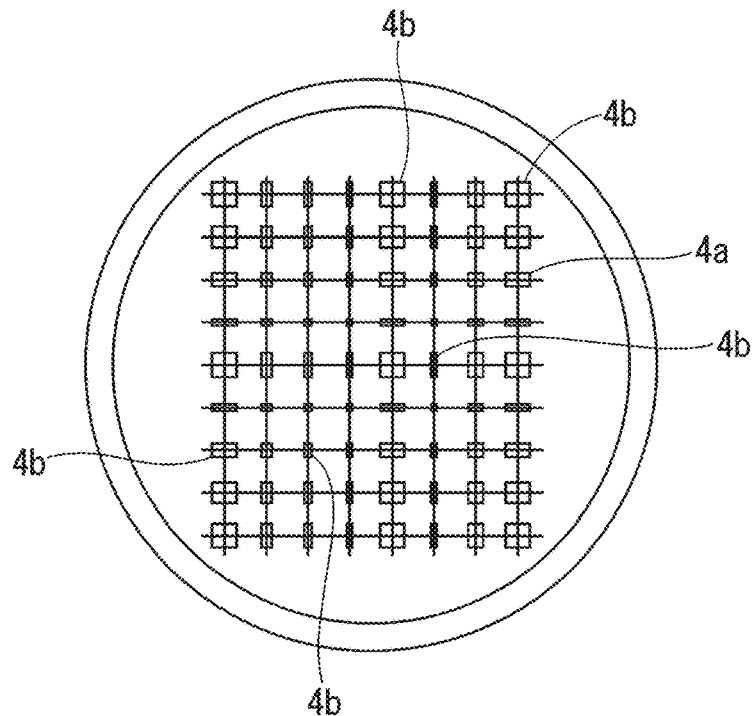
FIG. 2 illustrates an example of a dark field pattern of FIG. 1.

As the light source 2, an LED is used, or other light sources may be used. The collimate lens 3 collimates a light flux from the light source 2 and outputs it. The dark field pattern 4 has a two-dimensional pattern in which a number of slits 4b are arrayed in a black mask portion 4a as shown in FIG. 2, the details of which are described in Patent Literature 2 listed above. The polarization plate 5 polarizes a light flux which has passed through the dark field pattern 4 into s-polarized light with respect to the beam splitter 6. The beam splitter 6 has a semi-transmissive surface 6a, and reflects upward the light flux which has passed through the polarization plate 5. The focus lens 7 concentrates the reflected light from the beam splitter 6. The λ/4 plate 8 provides the light flux which has passed through the focus lens 7 with a phase difference. The light flux which has passed through the λ/4 plate 8 enters the liquid 9 enclosed within the cylindrical container 10 and is reflected on a surface of the liquid 9 (free liquid surface 9a). As the liquid 9, a liquid that has a small surface tension and a high specific gravity, and is less influenced by a temperature change, is preferably used, and for example, silicon oil, fluorine-based liquid or the like is selected. The free liquid surface 9a maintains a horizontal liquid surface with respect to an inclination of the surveying instrument (inclination sensor 1). The sign h' in FIG. 1 denotes a height from a bottom surface of the container 10 to a horizontal part of the liquid surface when the surveying instrument is horizontal. The sign h denotes a height of the container 10, and the sign D denotes a length in a certain horizontal direction which passes through the center of the container 10. The light flux reflected on the free liquid surface 9a is transmitted through the λ/4 plate 8, the focus lens 7, and the beam splitter 6 again, and received by the light receiving element 11. As the light receiving element 11, an image sensor, a two-dimensional area sensor or the like is used. A light receiving image (light receiving pattern) obtained by the light receiving element 11 is subjected to image analysis by the processing unit 12. The processing unit 12 detects a displacement amount of the received dark field pattern 4. As the processing unit 12, a CPU or the like is used.

In the description given above, the λ/4 plate 8 and the polarization plate 5 are provided to exclude a light flux reflected in an undesired direction. They are optional components. It is allowed that the above-described optical elements are constituted by other optical components and other optical elements are added. The above-described dark field pattern 4 is an example, and use of other patterns, such as dots, are also allowed as long as such other patterns have contrast recognizable through image analysis. The dark field pattern 4 may be a one-dimensional barcode, and the light receiving element 11 may be a line sensor. The above-described arrangement of the optical system is an example, and in the above-described case, a light flux enters the liquid 9 from below, however, a configuration in which the light flux enters the liquid 9 from above is also possible. In the configuration described above, a light flux enters the liquid 9 from a direction orthogonal to the horizontal liquid surface (horizontal part) of the free liquid surface 9a, however, a configuration in which a light flux enters the liquid 9 from a direction inclined with respect to the horizontal part of the free liquid surface 9a is also possible.

The gist of the present invention relates to size adjustment of the container 10 in the above-described inclination sensor 1 without actually preparing the container 10, and preparation of the container 10 at a minimum size. A designing method described hereinafter is realized by a personal computer or the like including at least a CPU, a RAM, a ROM, a keyboard, and a display as hardware elements. The ROM stores various programs to execute respective steps in this embodiment, and the CPU executes each program. Various conditions, etc., can be input from the keyboard. Graphs, simulation results, and calculated values of a liquid surface shape, etc., are output to the display.

Figure 3:
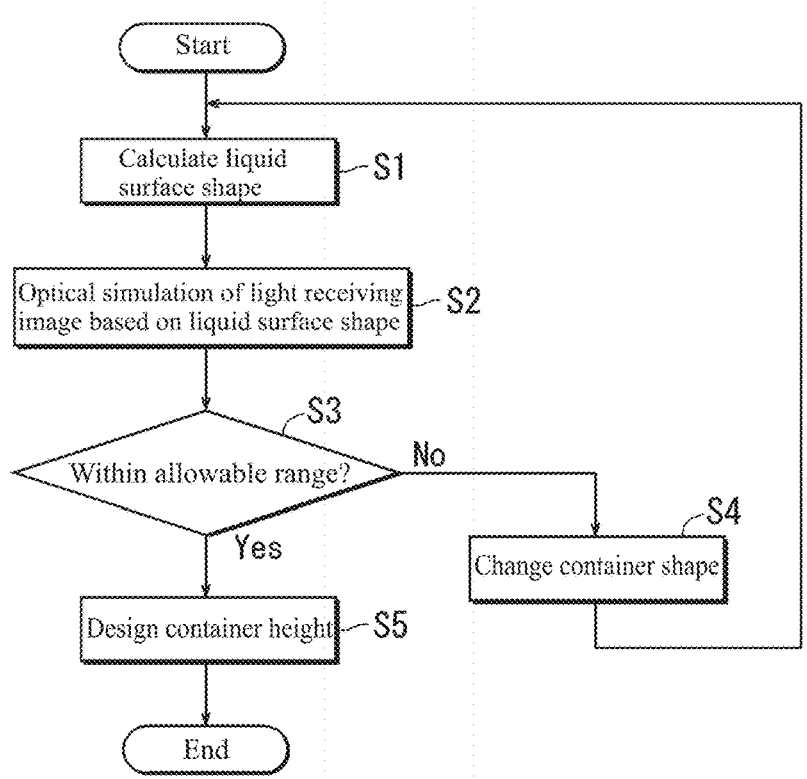
FIG. 3 is a flowchart relating to a method of designing a container of the inclination sensor according to the embodiment.

FIG. 3 is a flowchart relating to a method of designing the container 10 of the inclination sensor 1 according to the embodiment. Details of the respective steps are described later.

First, when design is started, the process shifts to Step S1, and a liquid surface shape in a case where the liquid 9 is enclosed within the container 10 having a certain shape is calculated (liquid surface calculating step).

Next, the process shifts to Step S2, and based on the liquid surface shape calculated in Step S1, a light receiving image to be obtained by the light receiving element 11 is optically simulated (optical simulation step).

Next, the process shifts to Step S3, and with reference to the results of the optical simulation, whether the shape of the container 10 is within an allowable range is judged in comparison with sensor specifications. When it is within the allowable range (YES), this shape is determined and the design can be ended. In the case where it is out of the allowable range (NO), the process shifts to Step S4, the shape of the container 10 is changed, and the process returns to Step S1 (container adjusting step). The "container height designing step" of Step S5 is described later.

(Liquid Surface Calculating Step)

Figure 4:
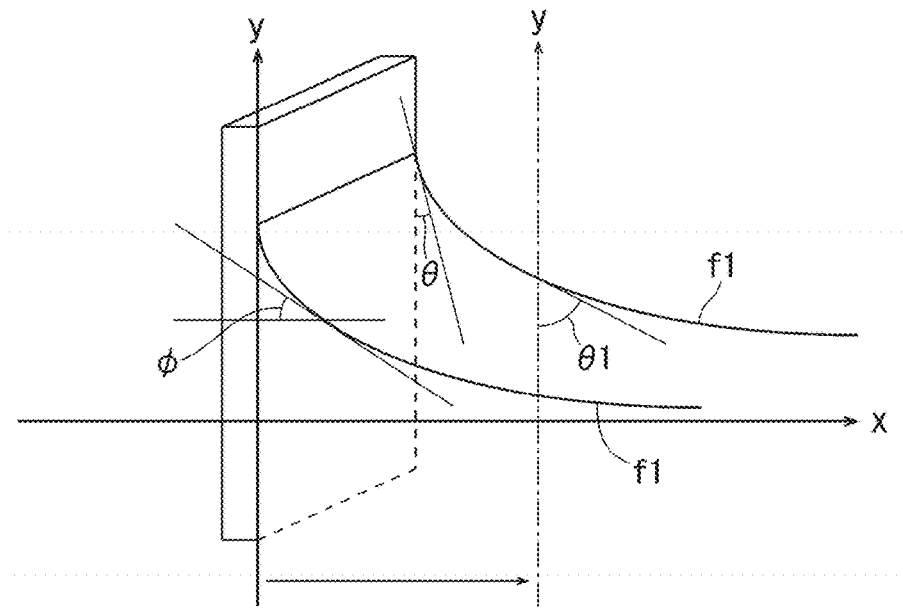
FIG. 4 illustrates a meniscus shape formed around an infinite vertical plate.

In the liquid surface calculating step, as a first step, a shape (meniscus) of a liquid surface of a liquid formed on a plate extending vertically and infinitely with respect to a horizontal part of the liquid surface as shown in FIG. 4 is obtained. This liquid surface shape is derived from the Young-Laplace formula and the hydrostatic pressure formula as follows (Makoto Miyazaki, Masami Mizutani, Tadashi Takemoto, Akira Matsunawa, "Analysis of Meniscus Configuration Formed on Circular Rod," Quarterly Journal of The Japan Welding Society, Vol. 15 (1997) No. 4, pp. 674-680). When x is a distance in a direction perpendicular to the vertical plate, y is a height of the liquid in a vertical plate direction, and ϕ is an angle between a horizontal plane and a curved surface, x and y are respectively expressed by [Numerical formula 1] and [Numerical formula 2]. Here, γ is a surface tension of the liquid, and ρ is a density of the liquid. θ is a contact angle between the vertical plate and the curved surface. By changing ϕ, a liquid surface shape from the vertical infinite wall surface can be obtained on two-dimensional orthogonal coordinates concerning the horizontal direction x and the vertical direction y. Hereinafter, a curve representing the liquid surface shape formed on the vertical infinite wall surface is referred to as a first curve f1.

$$x = \left( \ln \cot \frac{\varphi}{4} - 2\cos\left(\frac{\varphi}{2}\right) \right) \sqrt{\frac{\gamma}{\rho g}} \qquad \text{[Numerical formula 1]}$$

$$y = 2\sin\frac{\varphi}{2} \sqrt{\frac{\gamma}{\rho g}} \qquad \text{[Numerical formula 2]}$$

Next, it should be noted that the first curve f1 in the first step represents a shape in a state where the infinite vertical plate and the liquid are completely wet (contact angle θ=0°), however, in actuality, there is a case where the contact angle is θ≠0°. In this case, it is preferably corrected. In a second step, an actual contact angle θ1 between the container wall surface and the enclosed liquid is obtained, and the y-axis is offset in the x-axis direction to a position at which the angle between the first curve f1 and the y-axis corresponds to the actual contact angle θ1 (refer to the y-axis shown by the alternate long and short dashed line in FIG. 4). The actual contact angle θ1 can be obtained by dropping the liquid 9 to be enclosed on a material plate to be actually used to form the container 10 and actually measuring the angle (with use of, for example, an automatic contact angle meter DMs-601, Phoenix 150, or a height gauge HD-AX).

Figure 5:
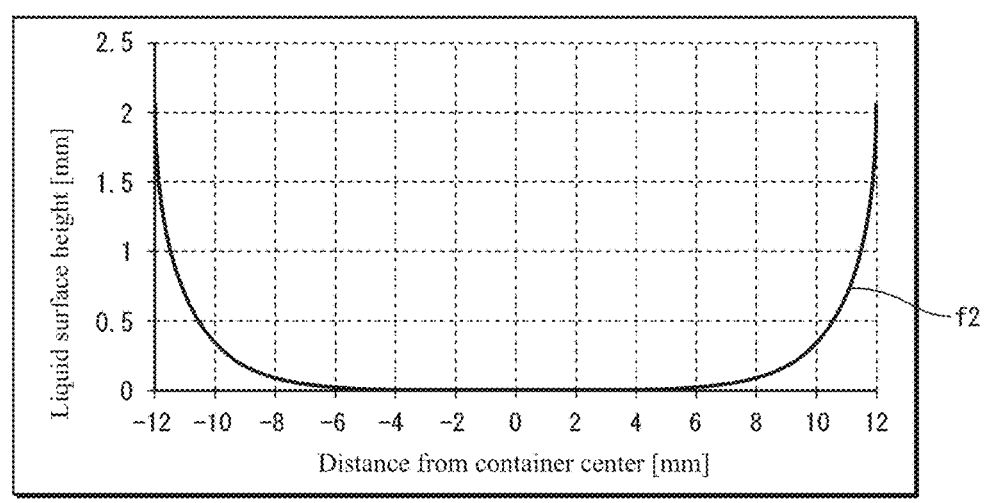
FIG. 5 is a diagram showing calculation result of shape of a liquid surface formed on both side wall surfaces.

Next, it should be noted that, although the actual container 10 is cylindrical and has both side wall surfaces, a liquid surface shape on one side wall surface is obtained through the steps described above. Therefore, it is corrected in a third step. FIG. 5 shows result of this correction, and shows result of calculation of liquid surface shape to be formed on both side wall surfaces. Details are described while referring to FIG. 5 by way of example. Through the first and second steps, the first curve f1 with respect to one side wall surface has been obtained (FIG. 5 was prepared by assuming the liquid surface tension γ=20.9 [mN/m], the liquid density ρ=965 [kg/m³], and the actual contact angle θ1=0°). In the third step, the length of the container 10 in the horizontal direction is assumed to be 24 mm, and in the first curve f1, a curve from x=0 to x=12 (that is, the assumed length in the horizontal direction/2) is developed bilaterally symmetrically about x=12, and by setting x=12 as a center (X=0) of the container, a new X axis (horizontal axis in FIG. 5) is set, and the y-axis of the first curve f1 is set as a Y axis (vertical axis in FIG. 5) representing a liquid surface height inside the container 10. Accordingly, a second curve f2 representing shape of the liquid surface on both side wall surfaces as shown in FIG. 5 can be obtained.

Figure 6:
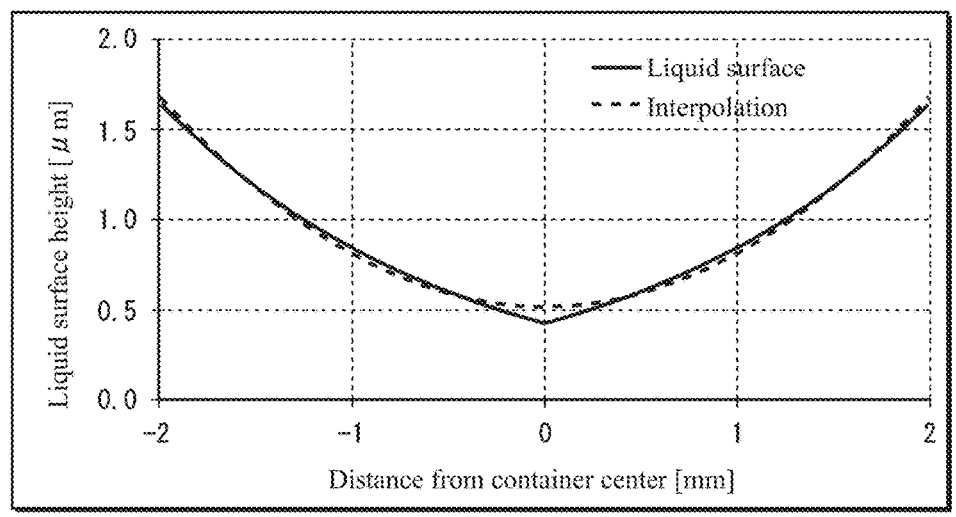
FIG. 6 is a diagram showing complement result of the shape of the liquid surface formed on both side wall surfaces.

Next, it should be noted that, in the liquid reflection inclination sensor, a shape neighboring the container center (neighboring X=0) is important. The liquid surface shape (FIG. 5) in the third step is prepared by crossing curves from the right and left, so that it lacks continuity neighboring the container center. Therefore, in a fourth step, the second curve f2 is interpolated by a quadratic function. A method of quadratic function interpolation is known. Without limiting to a quadratic function, the second curve f2 may be interpolated by a polynomial such as a cubic, quartic, quantic . . . . To reduce a load on hardware resources, quadratic function interpolation is preferable, and it was verified that satisfactory results can be obtained by quadratic function interpolation. Result of quadratic function interpolation of FIG. 5 is shown in FIG. 6. FIG. 6 shows the vicinity of the container center shown in FIG. 5 in an enlarged manner, and the horizontal axis X represents a distance [mm] from the container center, and the vertical axis Y represents a liquid surface height [μm]. The solid line shows a liquid surface shape obtained through the third step, and the dashed line shows a liquid surface shape interpolated through the fourth step. As described above, in the "liquid surface calculating step," the first step is mainly performed, and the second to fourth steps are performed as necessary so that a curve closer to an actual liquid surface shape can be obtained.

Figure 7:
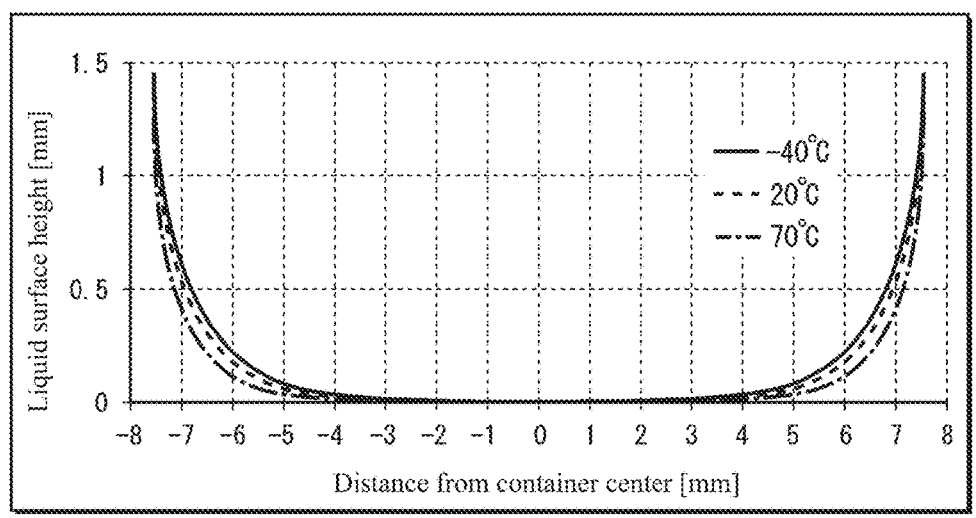
FIG. 7 is a diagram showing shapes of liquid surfaces formed on both side wall surfaces under respective temperature conditions.

FIG. 7 shows calculation results obtained through the above-described "liquid surface calculating step," and shows liquid surface shapes formed from the container wall surfaces under respective temperature conditions (−40° C., 20° C., and 70° C.). The horizontal axis in FIG. 7 represents a distance [mm] from the container center, and the vertical axis represents a liquid surface height [mm]. In FIG. 7, the liquid 9 is assumed to be a fluorine-based liquid, the actual contact angle θ1 is assumed to be 0°, the liquid surface tension γ is assumed to be 21.00 [mN/m] at −40° C., 16.40 [mN/m] at 20° C., and 12.75 [mN/m] at 70° C., the liquid density ρ is assumed to be 2000 [kg/m$^3$] at −40° C., 1869 [kg/m$^3$] at 20° C., and 1760 [kg/m$^3$] at 70° C., and the length of the container 10 in the horizontal direction is assumed to be 15 mm. From FIG. 7, it was verified that a liquid surface shape under each temperature condition can be estimated even when the temperature condition is changed.

(Optical Simulation Step)

Through the "liquid surface calculating step," a two-dimensional liquid surface shape inside the container 10 can be estimated based on the second curve f2. In the optical simulation step, an imaginary mirror plane 9a' is prepared by using a three-dimensional model Z=f (X, Y) of the second curve f2, and a light receiving image of a reflected light on the imaginary mirror plane 9a' is simulated.

Figure 8:
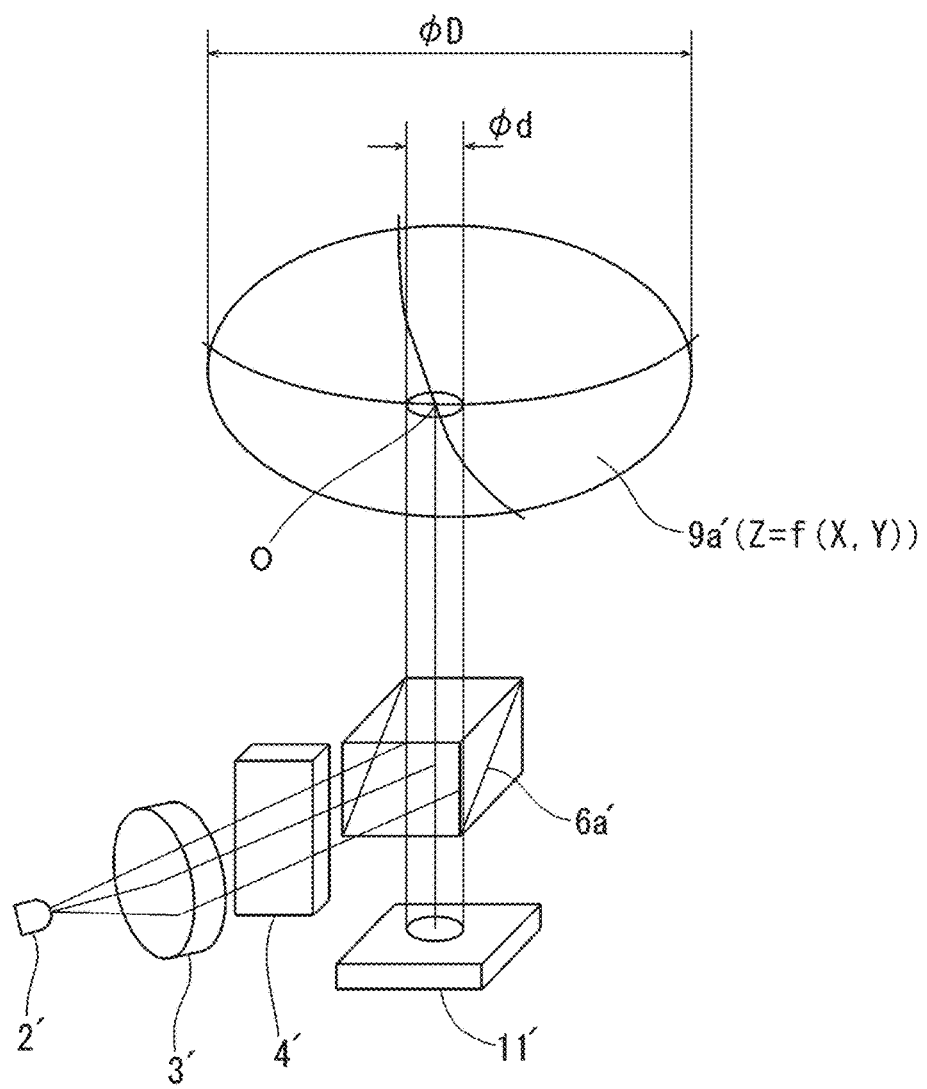
FIG. 8 is a diagram describing an imaginary optical system assumed in an optical simulation.

FIG. 8 shows an imaginary optical system assumed in the "optical simulation step." Light from a light source 2' is collimated by a collimate lens 3', passes through a dark field pattern 4', and is set toward the imaginary mirror plane 9' by a semi-transmissive surface 6a'. The imaginary mirror plane 9a' simulates a free liquid surface to be formed when the liquid is enclosed within a precise circular cylindrical container 10 with a diameter φD (refer to FIG. 8). A light receiving pattern reflected by the imaginary mirror plane 9a' is acquired by a light receiving element 11'. A light flux center from the light source which enters the imaginary mirror plane 9a' passes through the center O of the imaginary mirror plane 9a' (container center X=0). A light flux diameter φd (refer to FIG. 8) from the light source is an effective range of the liquid surface (the range to be used for analysis of the light receiving image), and is set depending on the performance of the light receiving element 11. The above-described optical simulation can be performed by using, for example, ZEMAX (made by ZEMAX Development Corporation). Without limiting to this software, other optical software available on the market may be used.

Figure 9:
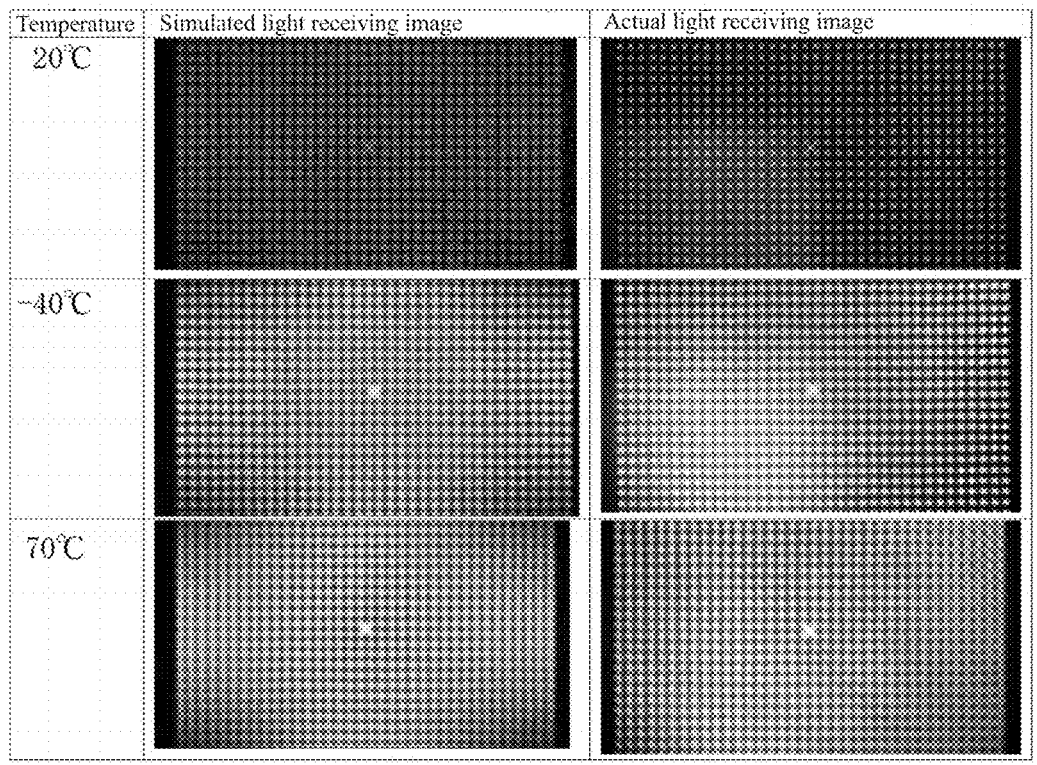
FIG. 9 is a diagram comparing light receiving images obtained by the optical simulation and actual light receiving images.

FIG. 9 is a diagram comparing light receiving images obtained through the "optical simulation step" and actual light receiving images. The right column in FIG. 9 shows light receiving images obtained by actual measurement in which a precise circular cylindrical container 10 was prepared to have a diameter of 15 mm and a fluorine-based liquid was enclosed within the container 10. The fluorine-based liquid in this specification is a solvent (organic solvent, etc.) containing fluorine as a constituent element. The left column in FIG. 9 shows light receiving images obtained through optical simulation in which the imaginary mirror plane 9a' shown in FIG. 8 was prepared by using the liquid surface shapes shown in FIG. 7. The first line shows light receiving images at 20° C., the second line shows light receiving images at −40° C., and the third line shows light receiving images at 70° C. From FIG. 9, it can be found that the simulation results (left column) are very similar to the actual results (right column) under the respective temperature conditions.

Figure 10A:
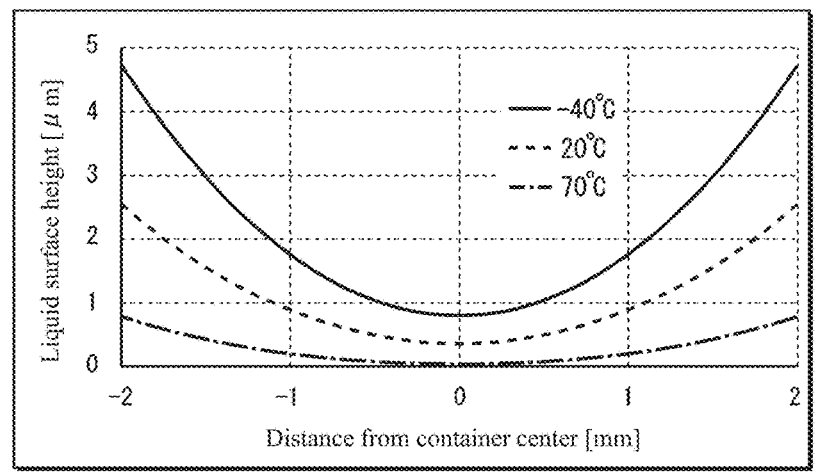
FIG. 10(a) is a diagram showing liquid surface shapes when the container diameter is 15 mm.
Figure 10B:
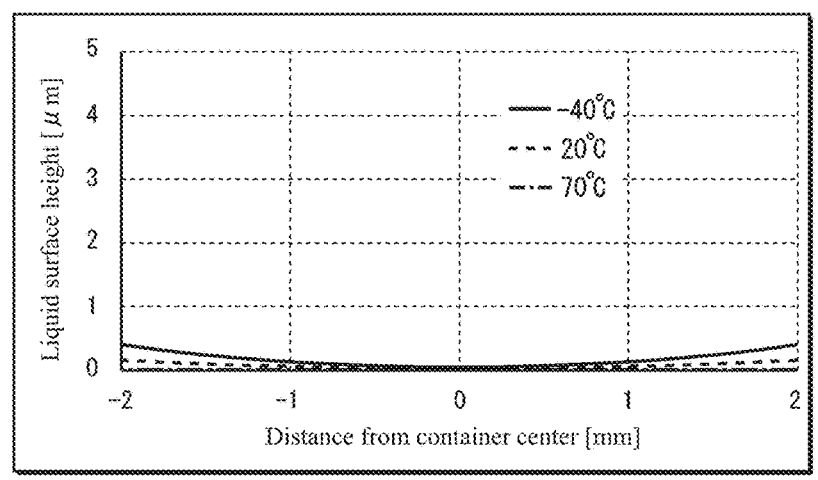
FIG. 10(b) is a diagram showing liquid surface shapes when the container diameter is 20 mm.

The left column in FIG. 9 shows the image which was highly focused at 20° C. but becomes blurry at −40° C. and 70° C. In this case, by increasing the diameter φD of the container 10, the change in liquid surface shape due to the temperature change can be reduced. FIG. 10 are diagrams showing liquid surface shape differences depending on the container diameters, and FIG. 10(a) is a diagram showing liquid surface shapes when the container diameter is 15 mm, and FIG. 10(b) is a diagram showing liquid surface shapes when the container diameter is 20 mm. FIG. 10 are obtained through the "liquid surface calculating step," and the horizontal axis represents a distance [mm] from the container center, and the vertical axis represents a liquid surface height [μm] inside the container. FIG. 10(a) is an enlarged view of FIG. 7, showing liquid surface shapes neighboring the container center in the case where the diameter of the container is φD=15 mm. FIG. 10(b) is a diagram showing liquid surface shapes neighboring the container center in the case where only the diameter of the container is changed to φD=20 mm. It can be verified that a change in liquid surface shape caused by a temperature change is reduced by increasing the diameter φD of the container. From this fact, the size of the container 10 can be adjusted by performing the "liquid surface calculating step" and the "optical simulation step" so that a desired light receiving image can be obtained, and further, a minimum size of the container 10 can be estimated by repeating the procedure above. Hereinafter, the method is described.

(Container Adjusting Step)

In the container adjusting step, from the results of the "optical simulation step," whether the shape of the container 10 is within an allowable range is judged in comparison with sensor specifications. This judgment is made based on whether numerical values showing image accuracy of the light receiving pattern are within allowable ranges as numerical value conditions satisfying demanded accuracy for the sensor. The numerical values showing image accuracy include any or a combination of a contract value and a value showing an edge rise, etc., of a light receiving pattern obtained with optical software. As detailed values of the numerical value conditions satisfying the sensor accuracy, values that a person skilled in the art selects may be used.

As shown in FIG. 3, when the numerical values showing image accuracy are within the allowable ranges (YES), the corresponding size of the container 10 is determined and the design may be ended. In the case where the values are out of the allowable ranges (NO), the process shifts to Step S4, and the size of the container 10 can be changed and adjusted so as to satisfy the sensor specifications, and by performing the flow shown in FIG. 11, a minimum container size corresponding to the sensor specifications can be obtained.

Figure 11:
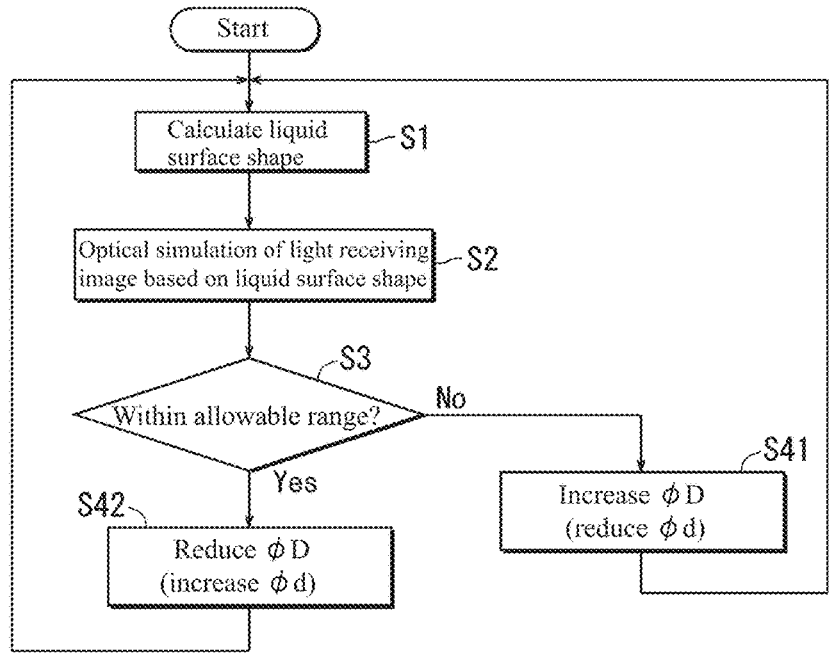
FIG. 11 is a flowchart describing in detail the container adjusting step shown in FIG. 3.

FIG. 11 is a flowchart showing details of the "container shape changing step" of Step S4 shown in FIG. 3. In FIG. 11, Steps S1 and S2 are as described in FIG. 3, and after the value of the light flux diameter $\phi d$ (refer to FIG. 8) is fixed, the diameter $\phi D$ (refer to FIG. 8) of the container 10 is temporarily set, and Steps S1 and S2 are performed. Next, the process shifts to Step S3, and whether numerical values showing image accuracy are within allowable ranges is judged in comparison with sensor specifications. In the case where the numerical values are out of the allowable ranges (NO), the process shifts to Step S41, the container diameter $\phi D$ is increased, and the process returns to Step S1. In the case where the numerical values are within the allowable ranges (YES), the process shifts to Step S42, the container diameter $\phi D$ is reduced, and the process returns to Step S1. By repeating this procedure, a minimum diameter $\phi Dmin$ of the container 10 can be determined. As the container diameter $\phi D$, a smaller value is determined as optimal as long as the numerical values showing image accuracy in the optical simulation are the same.

Alternatively, a design noted in brackets in Steps S41 and S42 in FIG. 11 is also possible. Due to limitation on space specifications inside the surveying instrument, there is a case where a space for the inclination sensor 1 is limited. That is, when the container diameter $\phi D$ is limited, the value of the container diameter $\phi D$ is fixed. Thereafter, a light flux diameter $\phi d$ is temporarily set, and Steps S1 and S2 are performed. Next, in the case where numerical values showing image accuracy are out of allowable ranges (NO) in Step S3, the light flux diameter $\phi d$ is reduced in Step S4, and the process returns to Step S1. In the case where the numerical values are within the allowable ranges (YES) in Step S3, the light flux diameter $\phi d$ is increased, and the process returns to Step S1. By repeating this procedure, an optimal light flux diameter $\phi d$ for the case where the container diameter $\phi D$ is limited can be determined. As the light flux diameter $\phi d$, a larger value is preferable as long as the numerical values showing image accuracy are the same since the accuracy of the light receiving element 11 can be relaxed.

As described above, according to the present embodiment, a light receiving image can be estimated without actually preparing the container 10 of the inclination sensor 1, and design feedback can be performed based on simulation results. In addition, even if the kind of the liquid 9 to be enclosed within the container 10 and/or the temperature condition are changed, a liquid surface shape of the liquid can be estimated, therefore, the container size can be easily adjusted. By repeating the feedback, a minimum container size can be obtained, therefore, the time and cost required for optimization of the shape of the container 10 can be significantly reduced.

Further, when a container diameter $\phi D$ (length of the container in the horizontal direction) is determined, an optimal height h (refer to FIG. 1) of the container 10 can also be determined.

Figure 12:
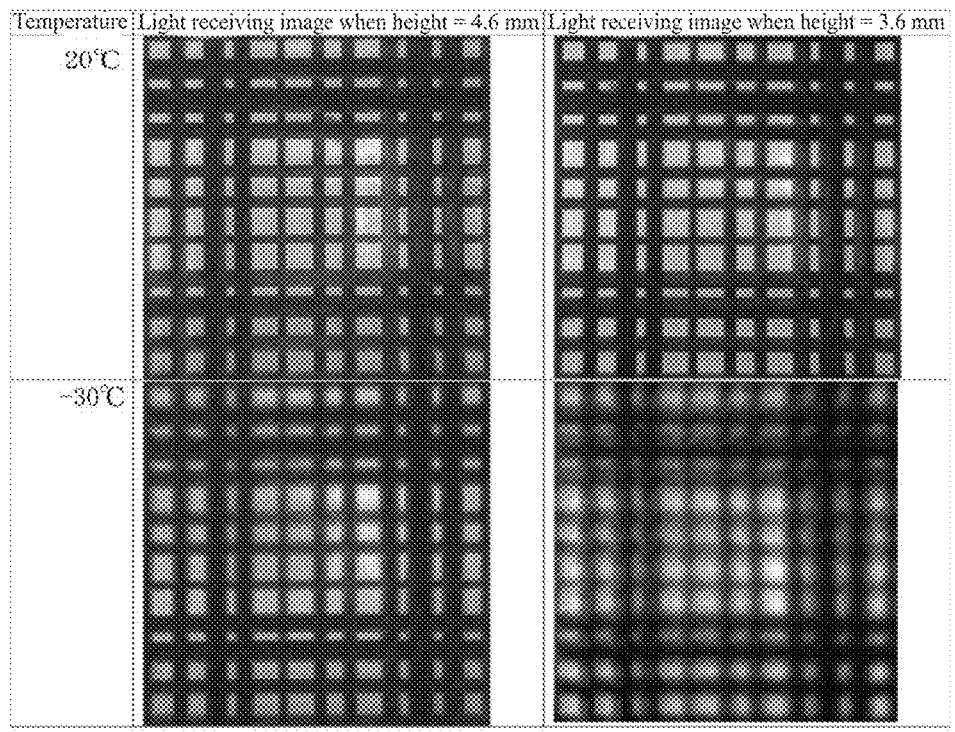
FIG. 12 is a diagram showing an influence of a difference in container height on a light receiving image.

FIG. 12 is a diagram showing influences of a difference in container height on light receiving images. FIG. 12 shows light receiving images obtained by enclosing a fluorine-based liquid in a precise circular cylindrical container 10 with a container diameter $\phi D=15$ mm which was actually prepared and actually measured under temperature conditions of 20° C. and −30° C. The right column shows light receiving images when the container height was h=4.6 mm, and the left column shows light receiving images when the container height was h=3.6 mm. In the container with a height of 3.6 mm, at a low temperature, the liquid 9 comes into contact with the container ceiling (lid body) and the liquid surface shape changes and the light receiving image is blurred. That is, even when the container diameter $\phi D$ satisfies the sensor specifications, the same results as the simulation cannot be obtained if the container height h is lower than the liquid surface height h' (refer to FIG. 1). To avoid this, the container 10 needs to have a certain height.

As the container height h, a necessary and minimum value can be obtained from a highest value of the liquid surface height at each temperature obtained through the "liquid surface calculating step." For example, in a case where a liquid with properties as shown in FIG. 7 is used, a highest value Ymax of the Y value of the second curve f2 is 1.43 mm, so that the container height h must be set to not less than a value resulting from adding 1.43 mm to the height h' of the horizontal liquid surface of the liquid 9 enclosed within the container 10. Thus, when a diameter $\phi D$ of the container 10 is determined, a minimum container height hmin that has no influence on the liquid surface shape can be determined based on hmin=h'+Ymax.

This "container height designing step" may be performed as Step S5 in FIG. 3 at the final stage after the optimal container diameter $\phi D$ (or light flux diameter $\phi d$) is determined. Accordingly, a container 10 with a container shape minimum in the height direction as well can be designed.

EXAMPLE

Figure 13:
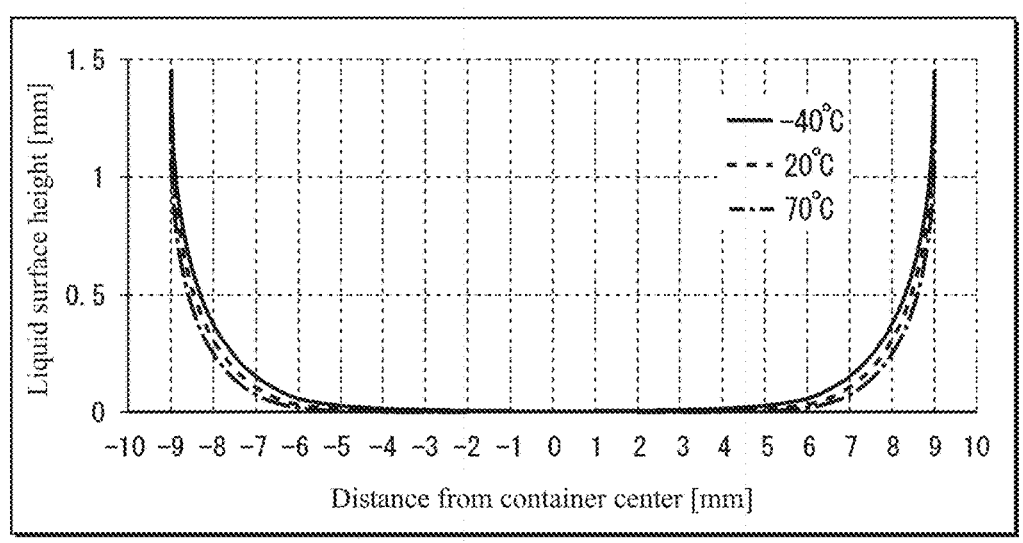
FIG. 13 is a diagram showing calculation results in a liquid surface calculating step of an example.

Hereinafter, an example is shown. FIG. 13 is a diagram showing calculation results in a liquid surface calculating step of the example. In the example, a fluorine-based liquid was used as the liquid 9. As properties of this liquid, a liquid surface tension $\gamma$ was 21.00 [mN/m] at −40° C., 16.40 [mN/m] at 20° C., and 12.75 [mN/m] at 70° C., a liquid density $\rho$ was 2000 [kg/m$^3$] at −40° C., 1869 [kg/m$^3$] at 20° C., and 1760 [kg/m$^3$] at 70° C., a capillary constant was 0.014 at −40° C., 0.013 at 20° C., and 0.012 at 70° C., and an actual contact angle $\theta 1$ was 0 degrees. The pattern pitch of the dark field pattern 4 was set to 80 μm, the pattern width was set to 40 μm, and the light flux diameter $\phi d$ was set to 2.5 mm. Under these conditions, the designing method according to the present embodiment was performed, and as a result, a minimum shape of the container 10 in this example had, as shown in FIG. 13, a minimum diameter $\phi Dmin=18$ mm, a highest Y value Ymax of 1.46 mm at −40° C., 1.33 mm at 20° C., and 1.21 mm at 70° C., it was therefore found that a minimum container height was hmin=h'+1.46 mm. That is, when the container diameter $\phi D$ is 18 mm or less, a horizontal part neighboring the container center (X=0) is lost, and the accuracy of the inclination sensor 1 deteriorates. When the container diameter $\phi D$ is 18 mm or more, the inclination sensor 1 becomes large in size.

Concerning the height, it was also found that when the height h of the container 10 is set to be not more than the liquid surface height h'+1.46 mm, the container ceiling comes into contact with the liquid 9 and the accuracy of the inclination sensor 1 deteriorates.

Figure 14A:
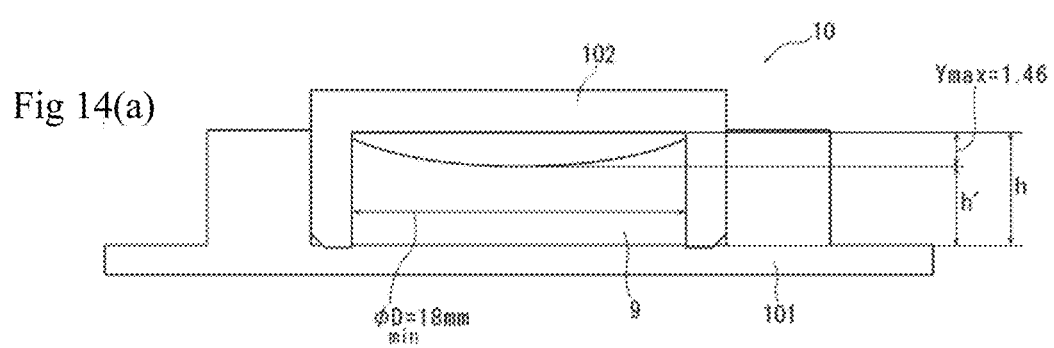
FIGS. 14(a) and 14(b) are sectional views showing form examples of a container of an inclination sensor formed according to the example.
Figure 14B:
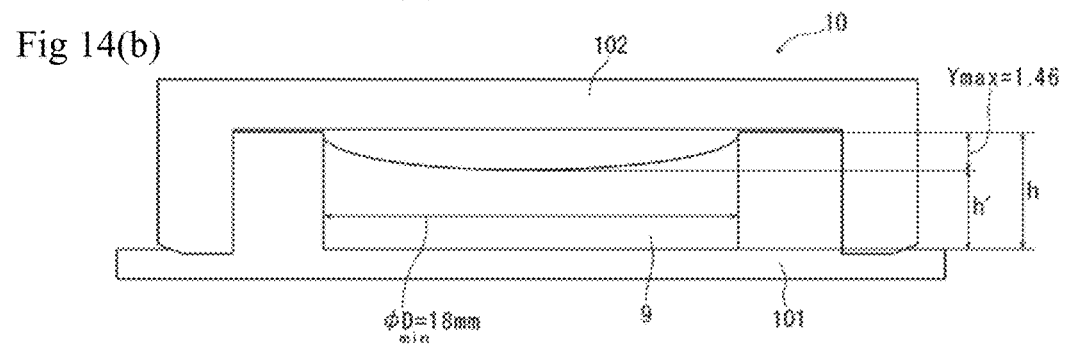

A form example of the container 10 of the inclination sensor 1 prepared based on the results of the above-described example is shown in FIG. 14. FIG. 14 are longitudinal sectional views of the container 10, and FIG. 14(a) shows a form example 1 and FIG. 14(b) shows a form example 2. The container 10 tightly encloses the liquid 9 by a bottomed precise circular cylindrical oil bath 101 containing the liquid 9 and a precise circular cylindrical lid body 102. FIG. 14(a) shows a form in which the liquid 9 is enclosed by bonding an inner circumferential surface of the oil bath 101 and an outer circumferential surface of the lid body 102, and FIG. 14(b) shows a form in which the liquid 9 is enclosed by bonding an outer circumferential surface of the oil bath 101 and an inner circumferential surface of the lid body 102. A height h' of a horizontal liquid surface is only required to be not less than 0 in a state where the surveying instrument (inclination sensor 1) is inclined to the maximum, and for example, on the assumption that h'=2 mm, the container 10 is prepared so that, in the form shown in FIG. 14(a), an inner diameter of the lid body 102 is 18 mm, and a height of an inner circumferential portion of the lid body 102 is 3.46 mm, and in the form shown in FIG. 14(b), the inner diameter of the oil bath 101 is 18 mm, and a height of an inner circumferential portion of the oil bath 101 is 3.46 mm.

It is also preferable that a minimum container height hmin is set by adding "container radius×tan (inclination angle)" to the value Ymax in preparation for inclination of the container 10. It is also preferable that, in consideration of accuracies of optical components, surface accuracies, or allowable tolerances of components, the value of the minimum diameter φDmin is provided with a margin of +20%. For such reasons, even a container 10 prepared to be larger than the minimally designed values in the present embodiment is also included in the scope of the present invention as long as the container 10 is prepared by using the method of the present invention.

Further, preferred modifications of the present embodiment are described.

(Modification 1)

In the description above, a method of designing and a method of preparing a precise circular cylindrical container 10 with a container diameter φD are illustrated, however, the methods of this embodiment are also applicable to other container shapes. For example, in a case where it is desired that a square-prismatic container 10 to be prepared, an optical simulation may be performed by using a three-dimensional model obtained by synthesizing second curves f2 respectively prepared in a diagonal direction of the container 10 and a direction orthogonal to two sides facing each other of the container 10. In a case where it is desired that an elliptical cylindrical container 10 to be prepared, an optical simulation may be performed by using a three-dimensional model obtained by synthesizing second curves f2 respectively prepared in a short axis direction and a long axis direction. Thus, by obtaining second curves f2 at a plurality of positions in a certain horizontal direction of the container 10, a liquid surface shape can also be estimated even for a polygonal or non-precise-circular container, so that based on the estimated liquid surface shape, the container 10 can be prepared at a minimum size.

(Modification 2)

As in the case of FIG. 12, even in a case where the container height h is low and the liquid surface comes into contact with the ceiling of the lid body 102, by synthesizing a liquid surface shape (second curve f2) formed from container wall surfaces and a liquid surface shape (first curve f1) formed from a ceiling wall surface, a liquid surface shape can be estimated. That is, even in a case where the container height h cannot be set to be high due to limitations on space specifications inside the surveying instrument, by performing the flow of FIG. 3 by using this liquid surface shape, the container diameter φD can be adjusted.

Preferred embodiments and modifications of the present invention are described above, and it is also possible to combine the respective embodiments and modifications based on knowledge of a person skilled in the art, and such a combined embodiment is also included in the scope of the present invention.

REFERENCE SIGNS LIST

1 Inclination sensor
2 Light source
3 Collimate lens
4 Dark field pattern
6 Beam splitter
7 Focus lens
9 Liquid
9a Free liquid surface
9a' Imaginary mirror plane (imaginary free liquid surface)
10 Container
11 Light receiving element
12 Processing unit

The invention claimed is:

1. A method of designing a container of a liquid reflection inclination sensor, comprising:
a liquid surface calculating step that calculates a shape of a liquid surface of a liquid in a horizontal direction "x" and a vertical direction "y" by utilizing the Young-Laplace formula and the hydrostatic pressure formula, the liquid surface formed on a plate extending vertically and infinitely with respect to a horizontal part of the liquid surface;
an optical simulation step that obtains a light receiving pattern by reflecting a dark field pattern irradiated from an imaginary light source on an imaginary mirror plane having the shape of the liquid surface; and
a container adjusting step that adjusts a shape of a cylindrical container for enclosing the liquid by judging whether image accuracy of the light receiving pattern satisfies demanded sensor accuracy.

2. The method of designing a container of a liquid reflection inclination sensor according to claim 1, wherein
the liquid surface calculating step comprises a second step that obtains an actual contact angle "θ1" of the liquid with the container, and offsets a y-axis of a first curve "f1" representing the shape of the liquid surface in an x-axis direction until an angle between the first curve "f1" and the y-axis corresponds to the actual contact angle "θ1."

3. The method of designing a container of a liquid reflection inclination sensor according to claim 2, wherein
the liquid surface calculating step comprises a third step that obtains the first curve "f1" from each of two directions, one is from one side wall of the container and the other is from an opposite side wall, and obtains a second curve "f2" representing a shape of the liquid surface in the container when "X" is a horizontal distance from a center of the container and "Y" is a height of the liquid surface.

4. The method of designing a container of a liquid reflection inclination sensor according to claim 3, wherein the liquid surface calculating step comprises a fourth step that complements the shape of the second curve "f2" neighboring X=0 by utilizing a polynomial expression.

5. The method of designing a container of a liquid reflection inclination sensor according to claim 3, wherein the container adjusting step conducts the optical simulation step while fixing a light flux diameter of light from a light source which enters the container and assuming a length of the container in the "X" direction, and then, reduces the length of the container in the "X" direction when the image accuracy of the light receiving pattern satisfies the demanded sensor accuracy, and increases the length of the container in the "X" direction when the image accuracy of the light receiving pattern does not satisfy the demanded sensor accuracy.

6. The method of designing a container of a liquid reflection inclination sensor according to claim 3, wherein the container adjusting step conducts the optical simulation step while fixing a length of the container in the "X" direction and assuming a light flux diameter of the light from the light source which enters the container, and then, reduces the light flux diameter when the image accuracy of the light receiving pattern satisfies the demanded sensor accuracy, and increases the light flux diameter when the image accuracy of the light receiving pattern does not satisfy the demanded sensor accuracy.

7. The method of designing a container of a liquid reflection inclination sensor according to claim 3, wherein the method further comprises a container height designing step that obtains a highest value "Ymax" of the Y-value of the second curve "f2," and then, designs a height "h" of the container so as to be equal to or higher than a value resulting from adding the highest value "Ymax" to a height "h'" of a horizontal part of the liquid surface of the liquid.

8. A liquid reflection inclination sensor, comprising:
a light source;
a collimate lens that collimates a light flux from the light source;
a dark field pattern where light from the collimate lens enters, and having contrast recognizable through image analysis;
a beam splitter that sets the light which has passed through the dark field pattern toward a free liquid surface;
a focus lens that concentrates the light from the beam splitter;
a liquid that forms the free liquid surface;
a container that encloses the liquid, formed in a cylindrical shape with a minimum horizontal length designed so that image accuracy of a light receiving pattern satisfies demanded sensor accuracy, the light receiving pattern obtained by utilizing the Young-Laplace formula and the hydrostatic pressure formula and by reflecting the dark field pattern on an imaginary mirror plane having a shape of a liquid surface of the liquid formed on a plate extending vertically and infinitely with respect to a horizontal part of the surface;
a light receiving element that receives a reflected light from the free liquid surface; and
a processing unit that analyzes a light receiving image of the light receiving element.

9. A method of producing a liquid reflection inclination sensor, comprising:
a liquid surface calculating step that calculates a shape of a liquid surface of a liquid in a horizontal direction "x" and a vertical direction "y" by utilizing the Young-Laplace formula and the hydrostatic pressure formula, the liquid surface formed on a plate extending vertically and infinitely with respect to a horizontal part of the liquid surface;
an optical simulation step that obtains a light receiving pattern by reflecting a dark field pattern irradiated from an imaginary light source on an imaginary mirror plane having the shape of the liquid surface;
a container adjusting step that adjusts a shape of a cylindrical container for enclosing the liquid by judging whether image accuracy of the light receiving pattern satisfies demanded sensor accuracy; and
a step of forming a cylindrical container with a set minimum horizontal length.

* * * * *